United States Patent Office 3,522,725
Patented Aug. 4, 1970

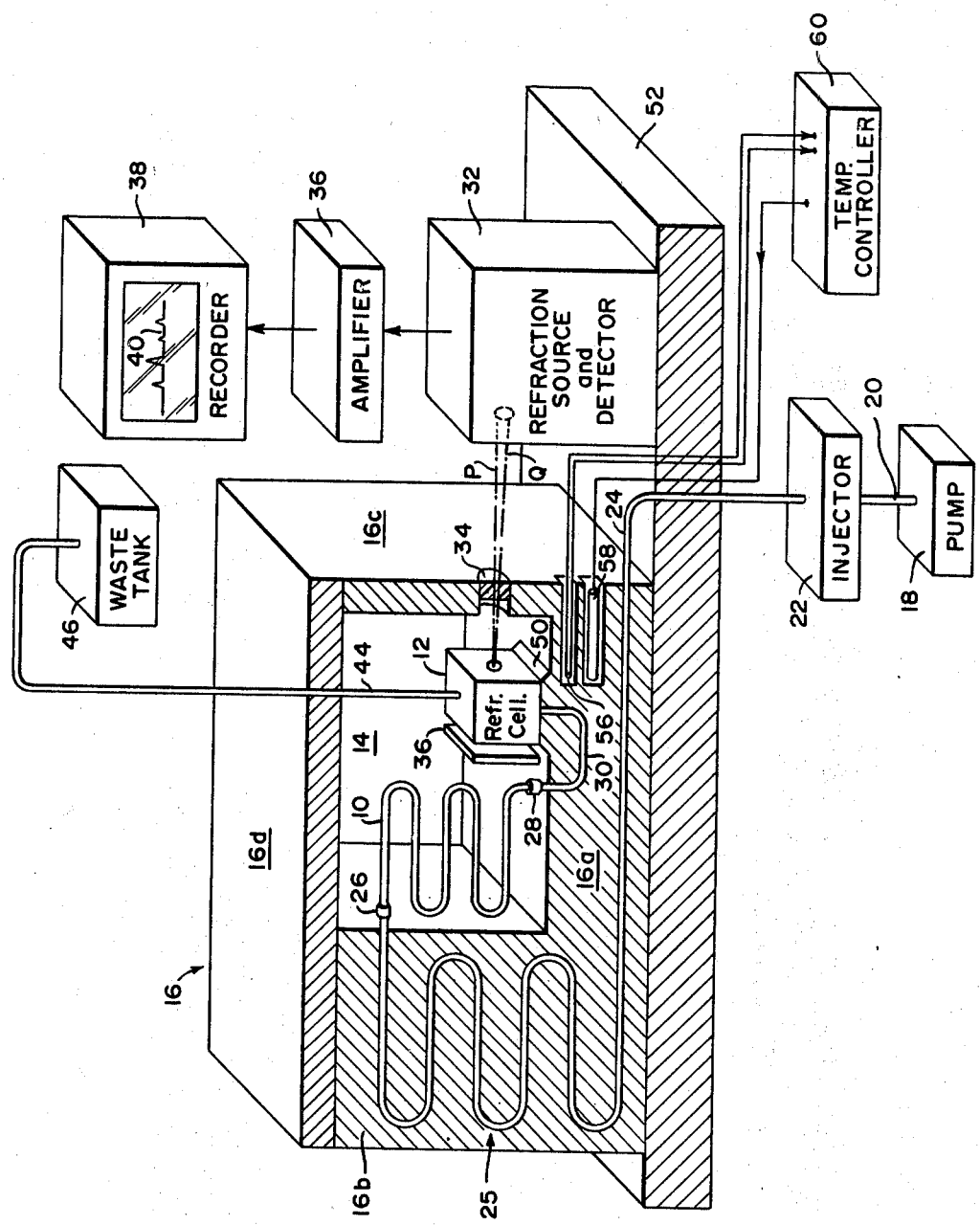

---

3,522,725
LIQUID CHROMATOGRAPH
James L. Waters, Framingham, Mass., assignor to
Waters Associates, Inc., Framingham, Mass.
Filed Jan. 8, 1969, Ser. No. 789,706
Int. Cl. G01n 31/08
U.S. Cl. 73—61.1                                    9 Claims

ABSTRACT OF THE DISCLOSURE

A liquid chromatograph has a small volume chromatography column and a refractometer cell housed in a single heat exchanger so that the coupling distance between them is kept to a minimum. The temperature of the liquid being analyzed is kept constant by circulating it through the heat exchanger just before it enters the column. Consequently, the viscosity and refractive index of the liquid remains essentially constant from the time it enters the column until it leaves the cell.

BACKGROUND OF THE INVENTION

This invention relates to liquid chromatographs. It relates more particularly to a liquid chromatograph employing a very small chromatography column and a refractometer for analyzing the output of the column.

Liquid chromatographs employing refractometers have been used in the past for analyzing liquids. These prior devices have, however, been subject to various shortcomings which have in one way or another limited their wider use. The shortcomings have included, for example, insufficient sensitivity for some applications, excessive size, weight and costliness. Also, these prior chromatographs are relatively susceptible to ambient temperature changes so that their results are not always accurate.

I have found that, for the most part, these disadvantages are due to the fact that the chromatography column and the refractometer cell in the prior units are housed separately and that the coupling distance between them is relatively long. Consequently, the temperature and, therefore, the viscosity and refractive index of the liquid entering the system may change as it flows through the column and to the cell, thereby introducing errors into the results. While some conventional systems maintain close control over the temperatures of the two enclosures so as to make them as equal as possible, still they are not entirely satisfactory. This is because the accuracy of that type of chromatograph depends upon the accuracy of the heat controller, and the temperature accuracy of present-day heat controllers falls below the requirements of the chromatograph, i.e. on the order of .01 degree per degree centigrade.

SUMMARY OF THE INVENTION

Accordingly, this invention aims to provide a liquid chromatograph which yields accurate results.

Another object of the invention is to provide a liquid chromatograph characterized by relatively small overall size and weight.

Still another object of the invention is to provide a liquid chromatograph which is relatively insensitive to ambient temperature changes.

A further object is to provide a chromatograph which yields an easily-read discriminating output.

Still another object of the invention is to provide a liquid chromatograph which is relatively inexpensive to make and maintain, yet is very rugged.

The invention accordingly comprises the features of construction, combination of elements and arrangement of parts which will be exemplified in the construction hereinafter set forth and the scope of the invention will be indicated in the claims.

Briefly, the subject chromatograph has a very small volume chromatography column and a refractometer cell housed in a single heat exchanger so that the coupling distance between the column and cell is short. The sample liquid is circulated through the heat exchanger just before it enters both the column and the cell so that its temperature remains substantially the same from the time it enters the column until after it leaves the cell. Consequently, the viscosity and refractive index of the sample liquid remain constant as well. As a result, each component of the sample elutes properly from the column and the index of refraction of each component is accurately reflected in the output of the refractometer. Also, because the coupling distance between the column and cell is so short, there is minimum dead volume in the system so that there is minimum zone mixing. Therefore, the refractometer generates a very discriminating electrical output in the form of sharp narrow peaks.

Further, in the present system, the chromatography column and the refractometer elements are all maintained in good thermal contact with one another and their temperature is kept substantially the same. Therefore, the output of the present system is relatively independent of ambient temperature changes.

BRIEF DESCRIPTION OF THE DRAWING

The drawing figure is a diagrammatic view with parts in section of a chromatograph embodying the principles of my invention.

DESCRIPTION OF THE PREFERRED EMBODIMENT

Referring now to the drawing figure, a chromatography column 10 and a refractometer cell 12 are positioned within a cavity 14 formed in a generally rectangular housing 16.

A pump 18 pumps carrier liquid by way of a tube 20 to an injector 22 at which a sample is introduced into the carrier liquid. Typically, the flow rate is very small, on the order of 1 cc./hr. From the injector, the sample liquid flows through a tube 24 extending through the housing walls 16a and 16b. Tube 24 winds back and forth through wall 16b, forming a heat exchange section 25 and is coupled at 26 to column 10.

The sample liquid elutes from the other end of column 10 which is coupled at 28 to a tube 30 leading to refractometer cell 12. Tube 30 is also maintained at the temperature of the wall of housing 16. As the output of the column flows through cell 12, the system detects changes in refractive index and, in this way, detects the different components of the sample liquid.

More particularly, a refractometer source and detector 32 emits a beam of light P through a window 34 in the wall 16c of housing 16. The light beam passes through the sample liquid in cell 12 and is reflected from a mirror 36 behind cell 12 back through the cell and is then picked up by refractometer source and detector 32. As the refractive index of the sample liquid changes, the angle of the return beam Q shifts proportionately and this shift is detected by photocells in detector 32.

Thus, column 10 separates the sample into its various components, each of which has a characteristic index of refraction. These elements leave column 10 one-by-one and pass through refractometer cell 12. In response thereto, detector 32 emits electrical pulses whose amplitudes are proportional to refractive indexes via an amplifier 36 to a conventional recorder 38. Recorder 38, in turn, provides a display of the refractive indexes of the sample components in the form of peaks 40. Once the liquid leaves cell 12, it is conducted by way of a tube 44 extending through the housing top wall 16d to a waste tank 46. Wall 16d may be in the form of a removable cover to allow access to the components inside housing 16.

Thus, the carrier liquid and sample make one pass through the system during which the sample is analyzed and then the carrier liquid and sample constituents are collected in waste tank 46 for disposal.

The viscosities of the carrier liquid and sample as well as the indexes of refraction of the sample constituents change with changes in temperature. The subject chromatographs are extremely sensitive instruments so that even a slight change in these properties between the time the sample enters column 10 and the time it leaves cell 12 is enough to spoil the results of the analysis. For this reason, housing 16 is designed specifically to maintain the carrier liquid and sample as well as column 10, cell 12 and the connecting tubing 30 at a uniform and substantially constant temperature during each sample run.

More particularly, as seen from the drawing, housing 16 is constructed of a rather massive block of a highly thermally-conductive material such as aluminum. Moreover, the housing bottom wall 16a and side wall 16b have large cross sectional areas. Tube 24 follows a rather long course through these housing walls; it is actually cast into them so that it is in good thermal contact therewith. Thus, as liquid flows through tube 24 on its way to column 10, it is in intimate heat exchange relationship with the housing walls and hence assumes substantially the same temperature as the walls.

In addition, the column 10 and cell 12 are physically close together within the housing cavity 14. Moreover, column 10 is constructed of a thermally-conductive material and is connected at both ends to the thermally conductive tubes 24 and 30 in or near the housing walls. Cell 12, in turn, seats on a flat pedestal 50 at the bottom of cavity 14 so that it, too, is in intimate heat exchange relationship with housing 16. As a result of the foregoing, the contents of housing 16 are maintained at substantially the same temperature as the housing walls. Therefore, there is substantially no change in the temperature of the liquid as it flows from column 10 through cell 12 so that its viscosity and refractive index remain constant all during the analysis. For the same reasons, the characteristics of the index sensing elements of the system, i.e. the mirror and cell, remain constant so that they yield an accurate index measurement.

The present system uses a small volume column, i.e. on the order of 1 millilitre. Also the system's interconnecting tubes 24 and 30 have minimum volumes, e.g. the inside diameter of the tubes is on the order of 0.020 inch and tube 30 is preferably less than 5 inches long. Therefore, the system minimizes so-called "dead" volume so that the peak spreading in the tubing is appreciably less than that in the column. Thus, the sample constituents leaving column 10 are separated into a train of relatively narrow distinct zones as they enter cell 12. This means that the output of the chromatograph is in the form of a series of sharp, easily-readable peaks 40 instead of the wider, less-defined peaks usually obtained with these systems.

Heat exchange section 25 is sufficient to bring the temperature of the incoming liquid to within 0.01 degree of the desired temperature. Under ideal conditions, this would be adequate. However, changes in the temperature or flow rate of the sample liquid entering section 25 tend to cause slow temperature changes in housing 16 because of a change in the heat demand. Also, a change in the ambient temperature around housing 16 or refractometer source and detector 32 could adversely affect the output of the chromatograph. Accordingly, housing 16 and source and detector 32 are maintained at substantially the same temperature by mounting them both on a relatively massive thermally-conductive base 52. Base 52 is conveniently made of lightweight aluminum or copper and is on the order of 1 inch thick, 2½ inches wide and 11 inches long. With the housing 16 and its contents, as well as source and detector 32, all held at substantially the same temperature, fluctuations in the ambient temperature do not affect the output of the system.

It is desirable also that the rate of change of temperature in the heat exchange section 25 be relatively slow in order to avoid false signals due to the changing temperature of the sample liquid as its preheats in the heat exchanger. This is accomplished in the present system by a proportional control circuit consisting of a thermistor 56 and heater 58 embedded in housing 16 and connected by way of temperature controller 60 so that a temperature change of heat exchange 25 due to a change in temperature in housing 16 alters the resistance of thermistor 56 which, through the action of amplifier 60, appropriately controls the heat generated by heater 58 to compensate. The use of this controller circuit can reduce the rate of temperature change and the total temperature change in housing 16 by 10 to 100 times and in this way can increase the stability of the system by 10 to 100 times. Of course, this controller circuit could also respond directly to the temperature of housing 16.

The chromatograph described herein yield a very accurate refractive index measurement and sample analysis. Also, the system is relatively independent of ambient temperature changes. Yet the chromatograph, requiring only one heat exchanger, is compact, lightweight and relatively inexpensive to make and maintain.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:
1. A chromatograph comprising:
  (A) a thermally-conductive housing, said housing including walls forming a chamber and having a relatively large cross sectional area forming a heat sink,
  (B) a relatively long thermally-conductive fluid inlet tube;
    (1) embedded in the heat sink, and
    (2) for connection to a chromatography column,
  (C) a refractometer cell inside said chamber, in intimate heat exchange relation with the heat sink, and
  (D) a thermally conductive fluid outlet tube in said housing;
    (1) having one end for connection to the chromatography column, and
    (2) having its other end connected to said cell.
2. A chromatograph as defined in claim 1 and further including a chromatography column connected between said tubes inside the housing.
3. A chromatograph as defined in claim 2 wherein:
  (A) said column has a volume less than about 2 millilitres, and
  (B) said outlet tube has a relatively small volume so that the peak spreading in said tube is less than that in said column.
4. A chromatograph as defined in claim 3 and further including:
  (A) a pump, and
  (B) a sample injector connected between said pump and said inlet tube so that a sample may be flowed through said column and cell for analysis.
5. A chromatograph as defined in claim 4 wherein said pump has a capacity on the order of 1 cc./hr.

6. A chromatograph as defined in claim 4 wherein said pump is a constant pressure pump.

7. A chromatograph as defined in claim 1 wherein said outlet tube has a segment embedded in the heat sink.

8. A chromatograph as defined in claim 1 and further including:
    (A) a refractometer detector, and
    (B) a relatively massive, thermally-conductive base, said housing and detector being mounted on said base in intimate heat exchange relation therewith so that they are maintained at substantially the same temperature despite ambient temperature changes.

9. A chromatograph as defined in claim 8 and further including means for regulating the temperature of said housing.

References Cited

UNITED STATES PATENTS

| | | | |
|---|---|---|---|
| 3,139,745 | 7/1964 | Sievers et al. | 73—23.1 |
| 3,232,093 | 2/1966 | Burow et al. | 73—23.1 |
| 3,285,055 | 11/1966 | Reinecke | 73—23.1 |
| 3,290,482 | 12/1966 | Dodd et al. | 73—23.1 X |
| 3,403,545 | 10/1968 | Carter | 73—23.1 |
| 3,407,647 | 10/1968 | Lynn | 73—23.1 |
| 3,440,397 | 4/1969 | Vesper et al. | 73—23.1 X |

S. CLEMENT SWISHER, Primary Examiner

J. W. ROSKOS, Assistant Examiner

U.S. Cl. X.R.

23—253; 210—31